(12) United States Patent
Naito et al.

(10) Patent No.: US 7,949,713 B2
(45) Date of Patent: May 24, 2011

(54) INFORMATION PROVIDING APPARATUS, PROVIDED INFORMATION PRESENTING APPARATUS, AND INFORMATION PROVIDING METHOD

(75) Inventors: Eiichi Naito, Kyoto (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 2134 days.

(21) Appl. No.: 10/485,068

(22) PCT Filed: Feb. 13, 2003

(86) PCT No.: PCT/JP03/01513
§ 371 (c)(1),
(2), (4) Date: Jan. 27, 2004

(87) PCT Pub. No.: WO03/069881
PCT Pub. Date: Aug. 21, 2003

(65) Prior Publication Data
US 2004/0233908 A1    Nov. 25, 2004

(30) Foreign Application Priority Data

Feb. 13, 2002   (JP) ................................ 2002-035221

(51) Int. Cl.
*G06F 15/16* (2006.01)
*G09G 5/00* (2006.01)

(52) U.S. Cl. .............................. 709/206; 345/8; 709/217

(58) Field of Classification Search ................... 709/206
See application file for complete search history.

(56) References Cited

U.S. PATENT DOCUMENTS

| | | | | |
|---|---|---|---|---|
| 5,592,307 | A | * | 1/1997 | Murai ........................... 358/468 |
| 5,905,789 | A | | 5/1999 | Will |
| 6,430,624 | B1 | * | 8/2002 | Jamtgaard et al. ............ 709/246 |
| 6,466,232 | B1 | * | 10/2002 | Newell et al. ................. 715/700 |
| 7,137,119 | B1 | * | 11/2006 | Sankaranarayan et al. ... 718/103 |

(Continued)

FOREIGN PATENT DOCUMENTS

DE    199 55 781 A 1    5/2001

(Continued)

OTHER PUBLICATIONS

Ujiie, Masami, "A Study on Communication Screening for Electronic Mail System," vol. 89, No. 456, IEICE Technical Report, The Institute of Electronics, Information and Communication Engineers, Mar. 16, 1990, pp. 37-42, Tokyo, Japan.

*Primary Examiner* — William C Vaughn, Jr.
*Assistant Examiner* — Joiya M Cloud
(74) *Attorney, Agent, or Firm* — Harness, Dickey & Pierce, P.L.C.

(57) ABSTRACT

In order to achieve secure provision of appropriate information according to the status of a plurality of terminal apparatuses, a status detecting section detects the status of a cellular mobile phone, and the like, and a communication destination apparatus determining section selects a terminal apparatus with which communication can be established and at which received information can be presented according to the priority for transmission of the provided information. A content DB retrieves information to be provided. A server communication section transmits retrieved provided information to the selected terminal apparatus. With such a structure, the provided information is presented at another terminal apparatus when a terminal apparatus having a high priority is impossible to establish communication or is unsuitable for presentation of the provided information. Thus, provision of information is securely achieved.

1 Claim, 21 Drawing Sheets

U.S. PATENT DOCUMENTS

| | | | |
|---|---|---|---|
| 7,376,897 B1* | 5/2008 | Mao | 715/714 |
| 2001/0052082 A1 | 12/2001 | Kinoshita | |
| 2002/0008145 A1* | 1/2002 | Walsh et al. | 235/462.46 |
| 2002/0087649 A1* | 7/2002 | Horvitz | 709/207 |
| 2003/0023690 A1* | 1/2003 | Lohtia | 709/206 |
| 2003/0083047 A1* | 5/2003 | Phillips et al. | 455/412 |
| 2004/0062130 A1* | 4/2004 | Chiang | 365/230.03 |

FOREIGN PATENT DOCUMENTS

| | | |
|---|---|---|
| FR | 2 823 405 | 10/2002 |
| GB | 2 315 191 A | 1/1998 |
| GB | 2315191 A * | 1/1998 |
| JP | 59-214365 A | 12/1984 |
| JP | 3-256426 A | 11/1991 |
| JP | 06-268676 | 9/1994 |
| JP | 2000-47980 A | 2/2000 |
| JP | 2001-075977 | 3/2001 |
| JP | 2001-237873 | 8/2001 |
| JP | 2001-357016 A | 12/2001 |
| JP | 2001-358837 A | 12/2001 |
| JP | 2001-358879 A | 12/2001 |
| JP | 2002-32399 A | 1/2002 |
| JP | 2002-111707 A | 4/2002 |
| WO | WO 01/39475 A1 | 5/2001 |
| WO | WO 02/03216 A1 | 1/2002 |
| WO | WO 02/084962 A1 | 10/2002 |

* cited by examiner

| Time zone | Priority 1 | Priority 2 | Priority 3 |
|---|---|---|---|
| 0:00~1:00 | Television set | Cellular mobile phone | Car navigation device |
| 1:00~2:00 | | | |
| 2:00~3:00 | | | |
| 3:00~4:00 | | | |
| 4:00~5:00 | | | |
| 5:00~6:00 | | | |
| 6:00~7:00 | | | |
| 7:00~8:00 | | | |
| 8:00~9:00 | Car navigation device | Cellular mobile phone | Television set |
| 9:00~10:00 | Cellular mobile phone | Car navigation device | Television set |
| 10:00~11:00 | | | |
| 11:00~12:00 | | | |
| 12:00~13:00 | | | |
| 13:00~14:00 | | | |
| 14:00~15:00 | | | |
| 15:00~16:00 | | | |
| 16:00~17:00 | | | |
| 17:00~18:00 | Car navigation device | Cellular mobile phone | Television set |
| 18:00~19:00 | Television set | Cellular mobile phone | Car navigation device |
| 19:00~20:00 | | | |
| 20:00~21:00 | | | |
| 21:00~22:00 | | | |
| 22:00~23:00 | | | |
| 23:00~0:00 | | | |

FIG. 22

| Time zone | Priority 1 | Priority 2 | Priority 3 |
|---|---|---|---|
| 0:00~1:00 | Television set | Cellular mobile phone | Car navigation device |
| 1:00~2:00 | | | |
| 2:00~3:00 | | | |
| 3:00~4:00 | | | |
| 4:00~5:00 | | | |
| 5:00~6:00 | | | |
| 6:00~7:00 | | | |
| 7:00~8:00 | Suspended | Suspended | Suspended |
| 8:00~9:00 | Car navigation device | Cellular mobile phone | Television set |
| 9:00~10:00 | Cellular mobile phone | Car navigation device | Television set |
| 10:00~11:00 | | | |
| 11:00~12:00 | | | |
| 12:00~13:00 | | | |
| 13:00~14:00 | | | |
| 14:00~15:00 | | | |
| 15:00~16:00 | | | |
| 16:00~17:00 | | Suspended | Suspended |
| 17:00~18:00 | Car navigation device | Cellular mobile phone | Television set |
| 18:00~19:00 | Television set | Cellular mobile phone | Car navigation device |
| 19:00~20:00 | | | |
| 20:00~21:00 | | | |
| 21:00~22:00 | | | |
| 22:00~23:00 | | | |
| 23:00~0:00 | | | |

116

INFORMATION PROVIDING APPARATUS, PROVIDED INFORMATION PRESENTING APPARATUS, AND INFORMATION PROVIDING METHOD

TECHNICAL FIELD

The present invention relates to techniques regarding a service for automatically providing various information to mobile information terminals, and the like, through a communication network represented by the Internet, or the like.

BACKGROUND ART

In recent years, a service for transferring various information to users has been realized in various forms along with rapid propagation and progress of the Internet. Especially due to the propagation of cellular mobile phones with which information provided through the Internet, such as WWW (World Wide Web) sites, e-mails, and the like, can be browsed, such information are accessible from various places.

However, conventional apparatuses, such as the above cellular mobile phones, or the like, are accompanied by such a problem that provided information is not always appropriately acquired in various situations. For example, if a user is not carrying a cellular mobile phone in his/her house, or if a user is in a place inappropriate for use of a cellular mobile phone, such as a traveling car, the user may miss the chance of timely acquiring information delivered to his/her cellular mobile phone.

Japanese Unexamined Patent Publication No. 2001-358837 discloses a technique wherein a call is sequentially given to a plurality of destinations (telephone numbers), and communication is established only with the first one that makes a response to the call. This technique improves the possibility that communication is established with any destination, but the destination is not always suitable for presentation of provided information. Thus, this technique does not necessarily largely increase the chance that the user appropriately acquires information.

DISCLOSURE OF INVENTION

In view of the above, an objective of the present invention is to realize more secured provision of appropriate information according to various situations in which a information-receiving terminal apparatus is placed.

In order to achieve the above objective, according to the present invention, destination information indicative of one or more provided-information presenting apparatuses is stored for each one information recipient. Among the provided-information presenting apparatuses, a destination to which provided information is to be transmitted is determined according to a priority determined based on the possibility for communication and suitableness for presentation of the provided information. In this way, the destination is determined not only based on whether or not a provided-information presenting apparatus is available for communication but also based on whether or not the provided-information presenting apparatus is suitable for presentation of the provided information or based on the degree of suitableness. Thus, presentation of appropriate provided information is readily achieved.

Determination as to whether or not to be suitable for presentation of provided information can be performed based on, for example, the operation status of a provided-information presenting apparatus. Specifically, when an interested provided-information presenting apparatus is in a state generally unsuitable for browsing a presentation of the provided information, for example, when the interested provided-information presenting apparatus is being charged with electric power or is connected to another device, the provided information can be presented at an alternative terminal apparatus that is more suitable for presentation of the provided information. Further, the suitableness of presentation can be determined according to the position of a provided-information presenting apparatus. Furthermore, it can be estimated whether or not a provided-information presenting apparatus is in a home or in a car according to the receiving state of remote control signal light or radio wave from a vicinal wireless device. Based on such information, it can be determined whether or not the apparatus is suitable for presentation. Furthermore, the suitableness of presentation can also be determined according to the operation state, for example, according to whether or not a provided-information presenting apparatus is in a pause mode where presentation of provided information is suppressed or in a silent mode where output of sound is suppressed.

Determination as to whether or not to be suitable for presentation of provided information can be performed based on, for example, the attribute of the provided information, e.g., which of a character, still picture, motion picture, sound, and the like, the provided information is, and the characteristics of the provided-information presenting apparatus, e.g., whether or not the provided-information presenting apparatus can present such information, the size of a screen, or the like. In the case where the provided information asks a reply of a user like a questionnaire, for example, it is determined that an apparatus having better manipulability is suitable for presentation of the provided information. Specifically, if it is necessary to input a text of a certain length for making a reply, it is determined that an apparatus having an input device, such as a keyboard, or the like, is suitable for presentation of the provided information.

When a provided-information presenting apparatus to which provided information is to be transmitted is not suitable for presentation of the provided information, the provided information may be subjected to a predetermined conversion before it is transmitted. Specifically, for example, the size of an image is decreased, a text is summarized, or only a title is extracted and transmitted. With such a conversion, appropriate presentation of the provided information is readily achieved even when the screen size of a provided-information presenting apparatus is small.

Selection of a provided-information presenting apparatus as a destination of provided information is performed based on, for example, information indicative of the priority which is set in advance for each user instead of determining the above-described suitableness of presentation. A more appropriate destination can readily be selected simply by setting the information indicative of the priority according to predetermined time zones or the days of the week. The information indicative of the priority may include information indicating that provided information is not transmitted to any device within a predetermined time zone or information indicating that provided information is transmitted after being suspended for a predetermined time period. With such information, excessive provision of information is readily suppressed, and provided information is readily transmitted to a more appropriate provided-information presenting apparatus even at a boundary between time zones where the priority changes. Furthermore, a more appropriate destination may be determined according to a combination of determination of the suitableness of presentation and a predetermined priority.

BRIEF DESCRIPTION OF DRAWINGS

FIG. 21 illustrates an example of priority information.

FIG. 22 illustrates another example of priority information.

BEST MODE FOR CARRYING OUT THE INVENTION

Hereinafter, embodiments of the present invention will be described with reference to the drawings.

Embodiment 1

Figure 1:
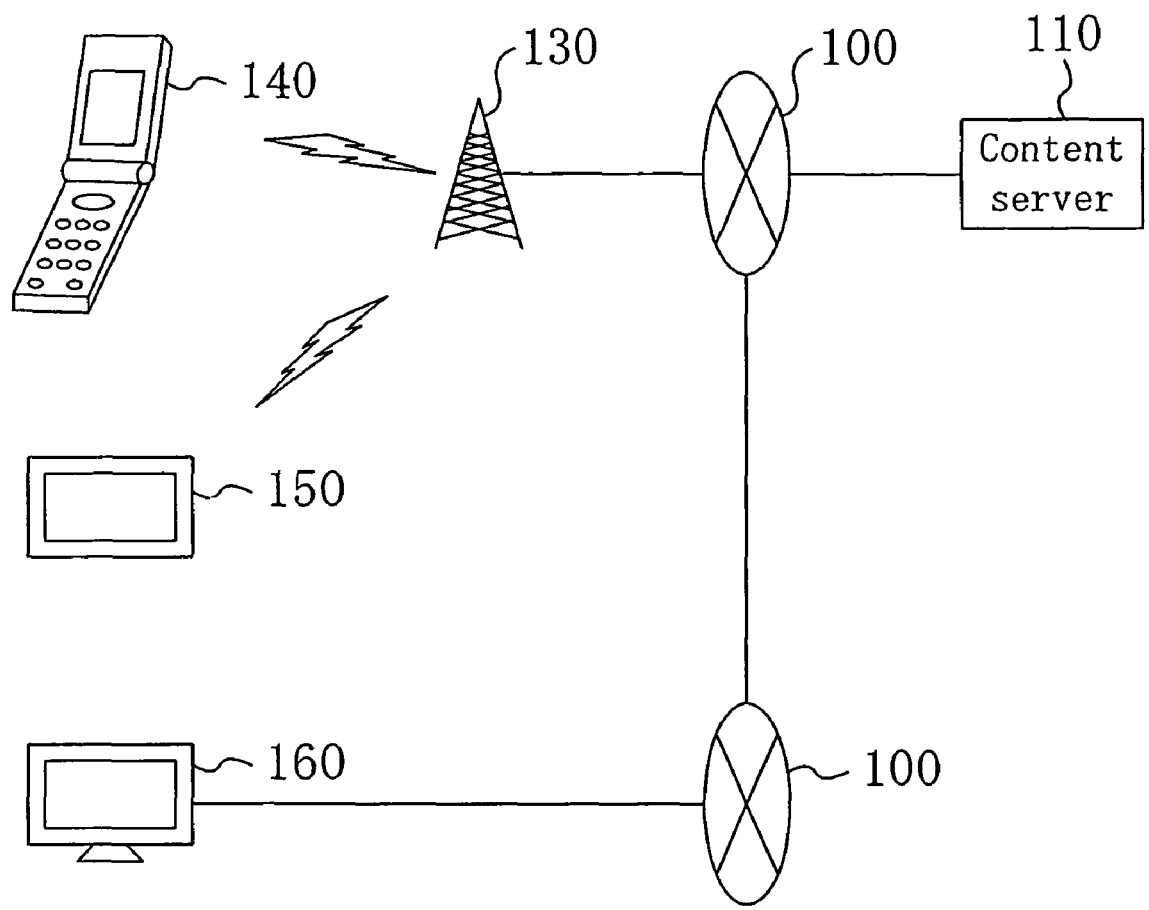
FIG. 1 illustrates the entire structure of an information providing system according to embodiment 1.

FIG. 1 illustrates the entire structure of an information providing system according to embodiment 1 of the present invention. In the structure of FIG. 1, reference numeral 110 denotes a server for accumulating and distributing a plurality of contents as recommendation information to be provided. Reference numeral 100 denotes a communication network represented by the Internet. Reference numeral 130 denotes a cellular mobile phone network. Reference numeral 140 denotes a cellular mobile phone, which is an example of a terminal apparatus for acquiring a content from the server 110 and presenting (recommending) the content to a user. Reference numeral 150 denotes a car navigation device which has the function of acquiring a content from the server 110 and presenting the content to a user. Reference numeral 160 denotes a television set which has the function of acquiring a content from the server 110 and presenting the content to a user.

The server 110 and the cellular mobile phone 140 are capable of communicating with each other through the communication network 100 and the cellular mobile phone network 130. The cellular mobile phone 140 and the like have IDs (identification information) allocated thereto for distinguishing from each other.

[Structure of the Server 110]

Figure 2:
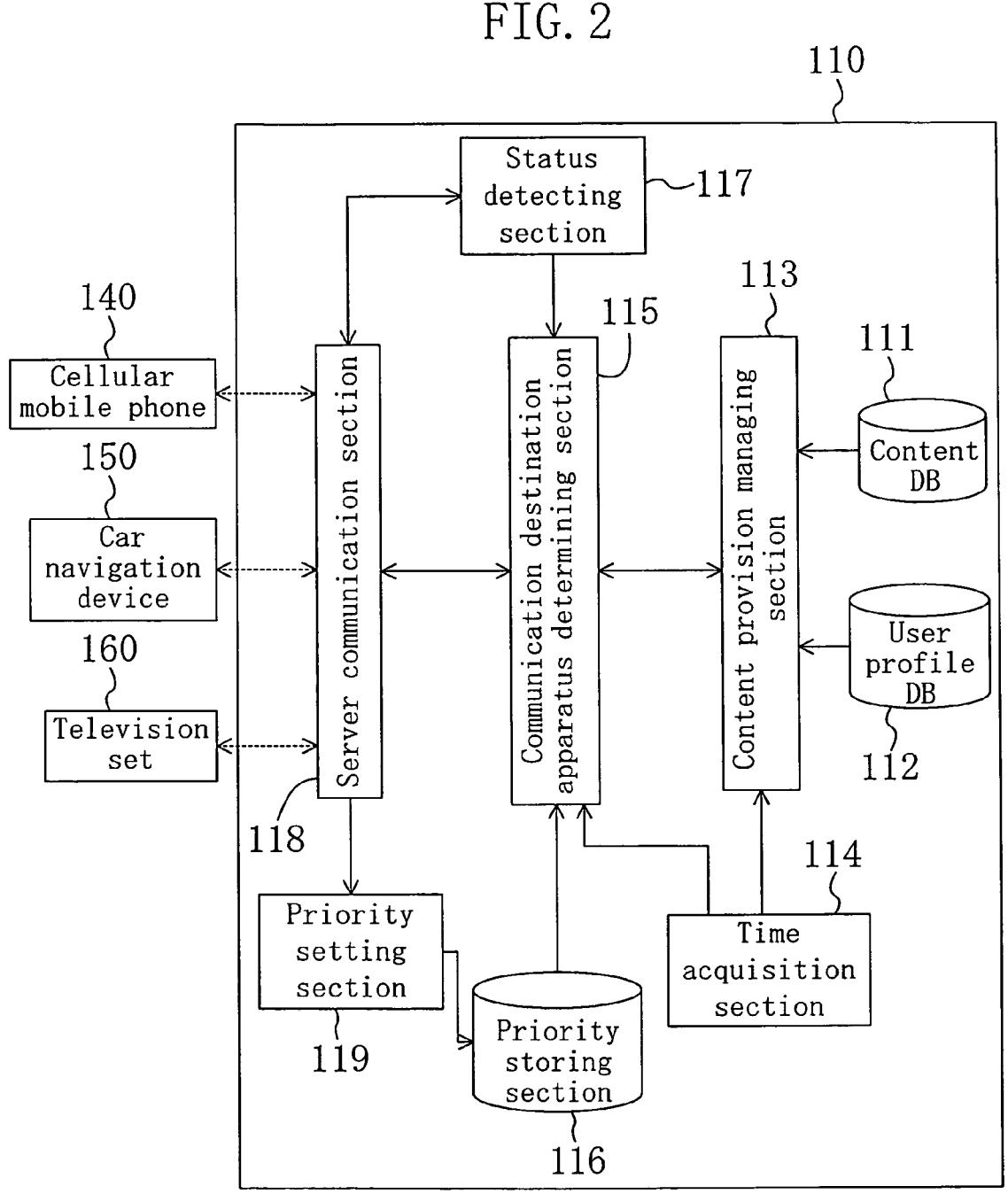
FIG. 2 is a block diagram showing in detail the structure of a server 110 according to embodiment 1.

More specifically, the server 110 is structured as shown in FIG. 2. Reference numeral 111 denotes a content DB (database) for storing a plurality of contents to be provided. Reference numeral 112 denotes a user profile DB for storing a user profile for retrieving (filtering) provided information. Reference numeral 113 denotes a content provision managing section for determining a content to be provided to a user and providing the determined content to the user. Reference numeral 114 denotes a time acquisition section for acquiring the time. Reference numeral 115 denotes a communication destination apparatus determining section (destination determining means) for selecting a terminal apparatus at which information is to be presented. Reference numeral 116 denotes a priority storing section (destination information storing means, priority information storing means) for storing information about the priority of terminal apparatuses at which information is to be presented. Reference numeral 117 denotes a status detecting section (communication possibility detecting means, presentation suitableness determining means, operation status detecting means) for detecting the status of the cellular mobile phone 140, more specifically, the possibility for communication, the suitableness for presentation of provided information, and the like. Reference numeral 118 denotes a server communication section (transmission means) for allowing the server 110 to communicate with the cellular mobile phone 140 and the like. Reference numeral 119 denotes a priority setting section (priority information setting means) for setting the priority in the priority storing section 116 according to an instruction from the cellular mobile phone 140, or the like.

Figure 3:
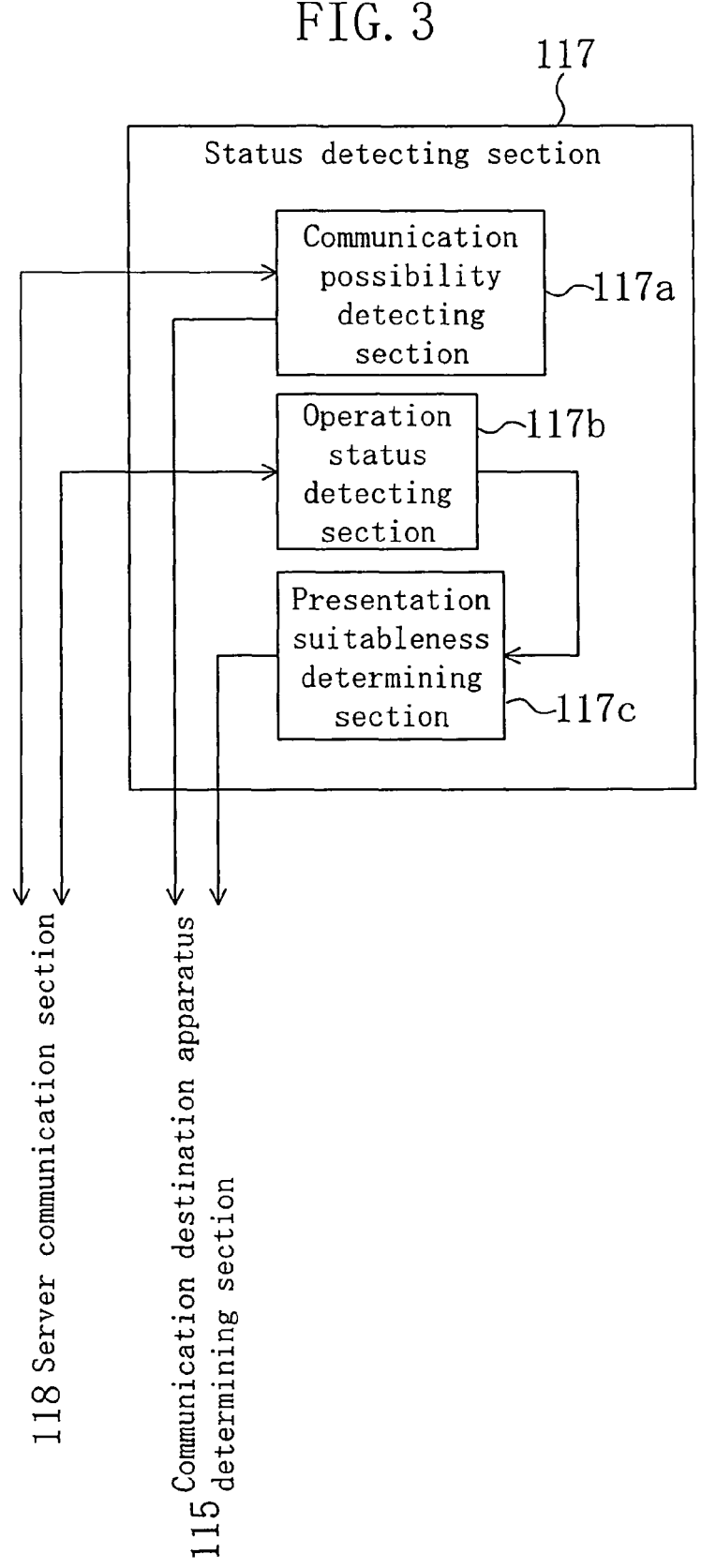
FIG. 3 is a block diagram showing in detail the structure of a status detecting section 117 according to embodiment 1.

Specifically, as shown in FIG. 3, the status detecting section 117 includes a communication possibility detecting section 117a, an operation status detecting section 117b and a presentation suitableness determining section 117c. The communication possibility detecting section 117a detects whether or not communication with the cellular mobile phone 140, or the like, is possible. The operation status detecting section 117b detects the operation status of the cellular mobile phone 140, or the like, for example, whether or not the cellular mobile phone 140 is in a pause mode where presentation of provided information is suppressed, a silent mode where output of sound is suppressed, or in a low power mode where a backlight of a display section is turned off, even when the communication is possible. The presentation suitableness determining section 117c determines based on the above operation status as to whether or not presentation of provided information is possible or suitable.

[Structure of the Cellular Mobile Phone 140 and the Like Apparatuses]

Figure 4:
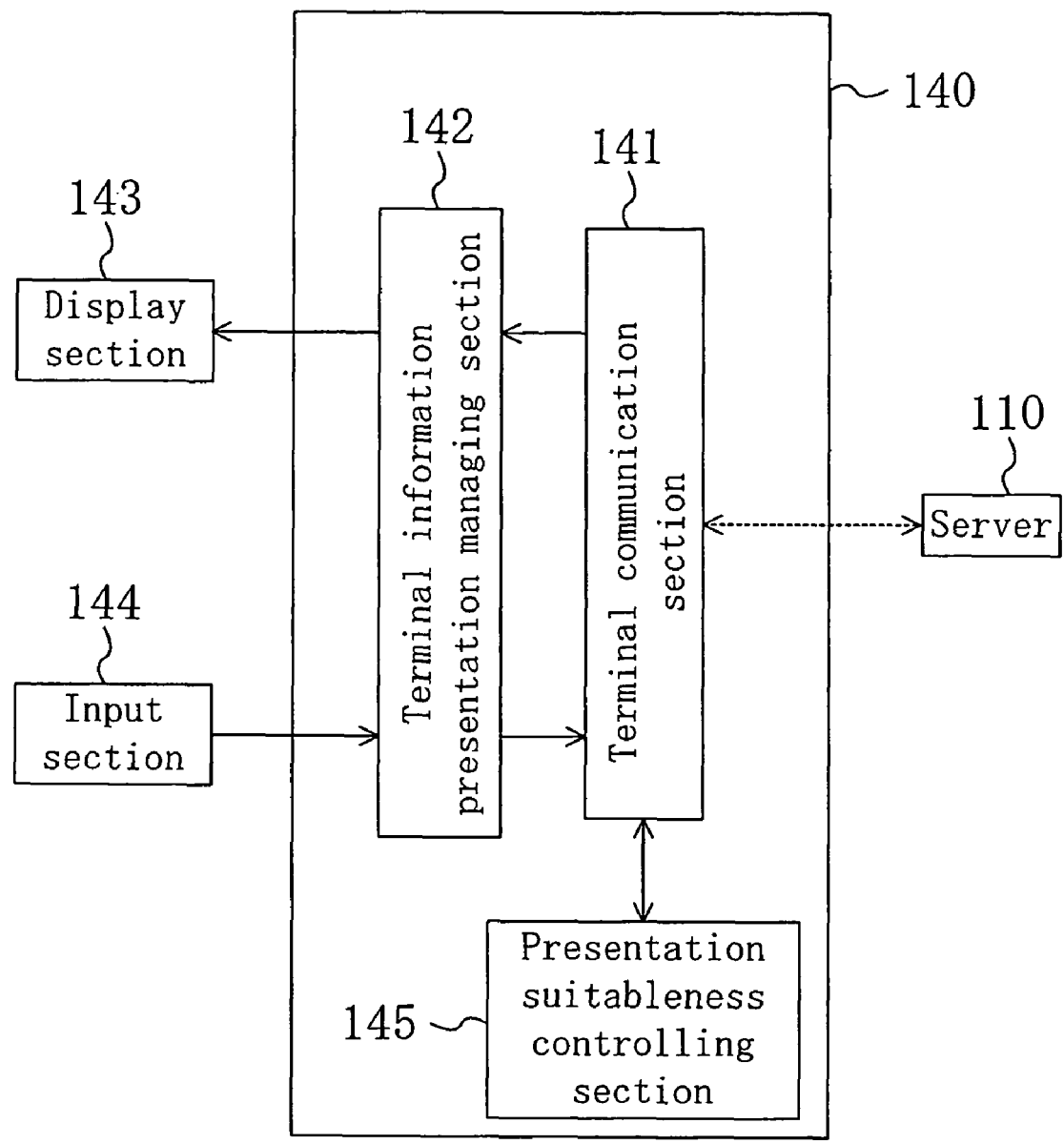
FIG. 4 is a block diagram showing in detail the structure of a cellular mobile phone 140 according to embodiment 1.

Specifically, the cellular mobile phone 140 and the like apparatuses are structured as shown in FIG. 4. Herein, the cellular mobile phone 140, the car navigation device 150 and the television set 160 each have their original functions, but the function and structure as a terminal apparatus of receiving provided information are the same among these elements. Thus, the cellular mobile phone 140 is herein described as a representative of these elements.

Reference numeral 141 denotes a terminal communication section (operation status information transmitting means, characteristic information transmitting means) for allowing the cellular mobile phone 140 to communicate with the server 110. Reference numeral 142 denotes a terminal information presentation managing section for managing presentation of information to a user. Reference numeral 143 denotes a display section (presentation means) for displaying provided information. Reference numeral 144 denotes an input section for receiving an input manipulation from a user. Reference numeral 145 denotes a presentation suitableness controlling section (operation status controlling means) for storing and controlling the suitableness for presentation of information transmitted from a server.

[Contents Stored in the Content DB 111]

Figure 5:
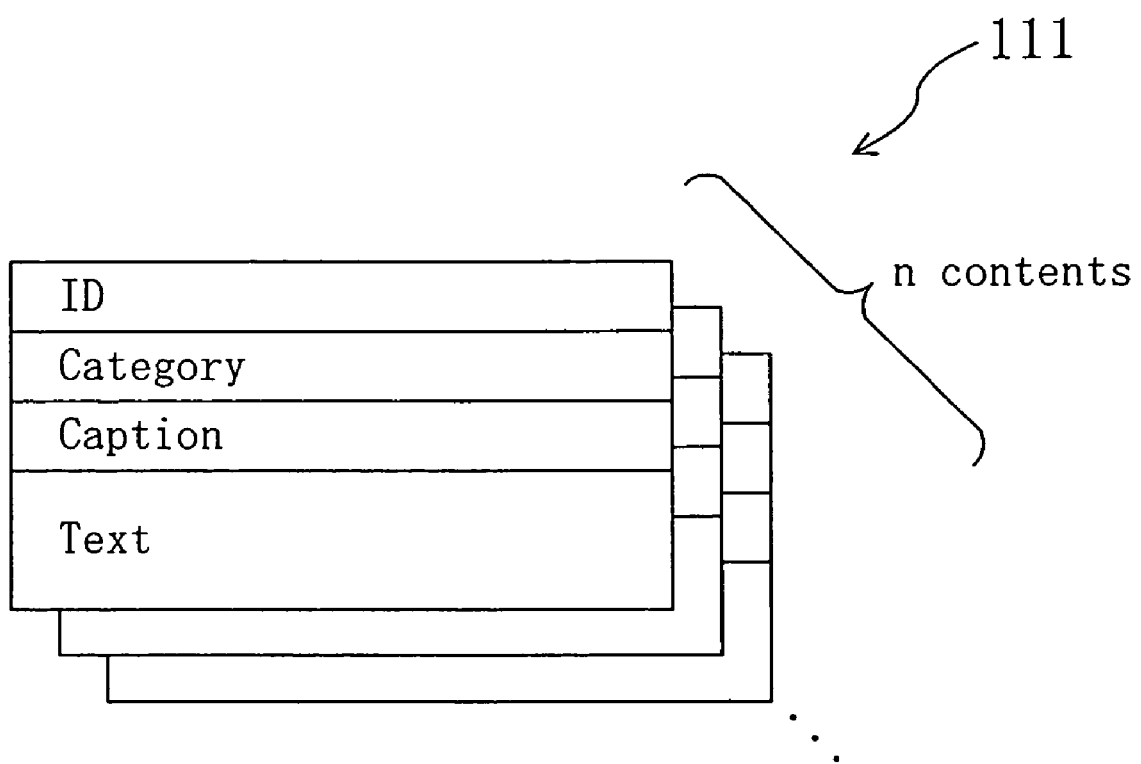
FIG. 5 illustrates an example of contents stored in a content DB 111 according to embodiment 1.

The content DB 111 stores a plurality of given contents to be provided in the form of a certain structure as shown in FIG. 5, for example.

For example, a content is formed by:

(1) a content ID (unique to each content);

(2) a category within which the content falls;

(3) a caption of the content; and (4) a text in the HTML (Hyper Text Markup Language) format.

The above contents are provided with maintenance, such as addition, deletion and updating, by an administrator whenever necessary.

[Other Stored Contents and the Like]

The user profile DB 112 stores a user profile used for selecting a content to be presented to a user. Specifically, for example, a user profile is in the form of a vector, (1, 0, 0, 1, 0, 0), for categories of provided information, (gourmet, television, music, fashion, life, sport), where the value of a category a user is interested in is "1" and the value of a category a user is not interested in is "0". These values are set by any unshown means, such as an entry form or document on a homepage, or the like.

The priority storing section 116 stores, for each user, information about the priority of terminal apparatuses to which provided information is to be transmitted, for example, information about the priority among the cellular mobile phone 140, the car navigation device 150 and the television set 160. The priority is set by the priority setting section 119 using, for example, an entry form on a homepage, or the like.

Figure 6:
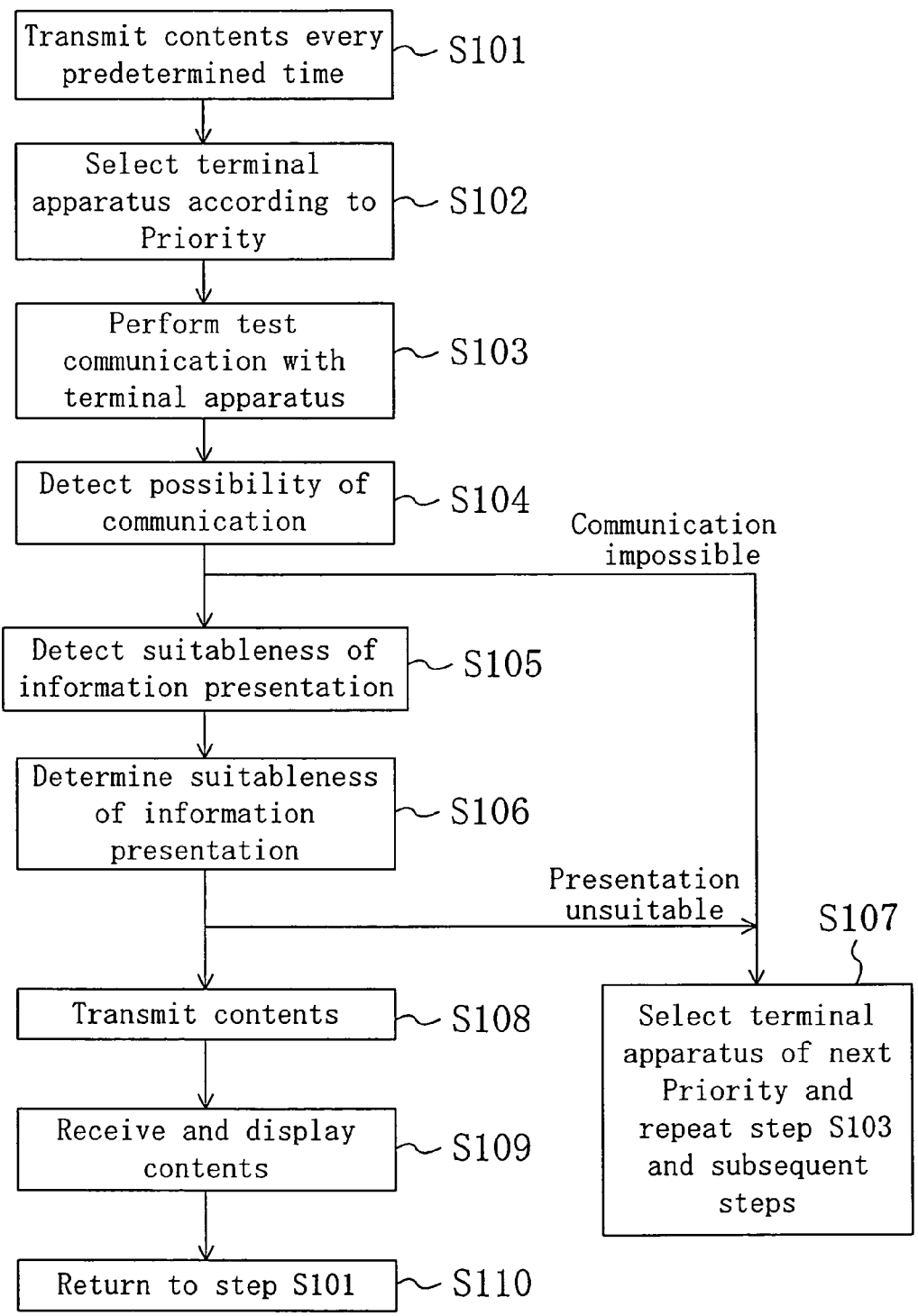
FIG. 6 is a flowchart illustrating a presentation information providing process according to embodiment 1.

[Operation of Information Providing System (FIG. 6)]

An operation of the information providing system having the above structure, which is carried out when information to be presented is provided, is described below.

(S101)

In the server 110, the content provision managing section 113 acquires the present time from the time acquisition section 114 and periodically performs the process of subsequent steps from step S102 to step S110 to transmit provided information to the cellular mobile phone 140 and the like.

(S102)

The communication destination apparatus determining section 115 extracts the priority of terminal apparatuses from the priority storing section 116 to select a terminal apparatus having the highest priority. Herein, for example, the cellular mobile phone 140 is first selected.

(S103)

The communication destination apparatus determining section 115 performs a test communication with the selected terminal apparatus through the server communication section 118.

(S104)

According to a result of the test communication, the communication possibility detecting section 117a of the status detecting section 117 detects the status (communication status) of the terminal apparatus. If the detected status indicates that communication with the terminal apparatus is possible, the communication destination apparatus determining section 115 proceeds to step S105. If the detected status indicates that communication is impossible, the communication destination apparatus determining section 115 proceeds to step S107.

(S105)

The communication destination apparatus determining section 115 then queries the terminal apparatus as to whether or not presentation of information at the terminal apparatus is suitable. In the cellular mobile phone 140, the terminal communication section 141 extracts suitableness information as to presentation of information from the presentation suitableness controlling section 145 and sends it to the server 110. The value of the suitableness information can be set by a user by the terminal information presentation managing section 142 through an input section 144 whenever necessary.

(S106)

In the server 110, the operation status detecting section 117b of the status detecting section 117 receives the presentation suitableness information and outputs it to the presentation suitableness determining section 117c. The presentation suitableness determining section 117c determines whether or not presentation is suitable and outputs the determination result to the communication destination apparatus determining section 115. If the determination result indicates that presentation of information at the terminal apparatus is "suitable", the communication destination apparatus determining section 115 proceeds to step S108. If "unsuitable", the communication destination apparatus determining section 115 proceeds to step S107.

(S107)

If communication or presentation of provided information is impossible at step S104 or step S106, the communication destination apparatus determining section 115 selects a terminal apparatus having the second highest priority. The process of step S103 and subsequent steps is repeated till a terminal apparatus with which communication can be established and at which presentation of information is "suitable" is encountered. If no such terminal apparatus is encountered, the communication destination apparatus determining section 115 returns to step S101 and waits for next transmission of provided information.

(S108)

If communication is possible at step S104 and presentation of provided information is suitable at step S106, the content provision managing section 113 extracts a user profile from the user profile DB 112. The content provision managing section 113 retrieves from the content DB 111 one of the contents included in a category whose user profile value is 1 and transmits the retrieved content to the terminal apparatus.

(S109)

Figure 7:
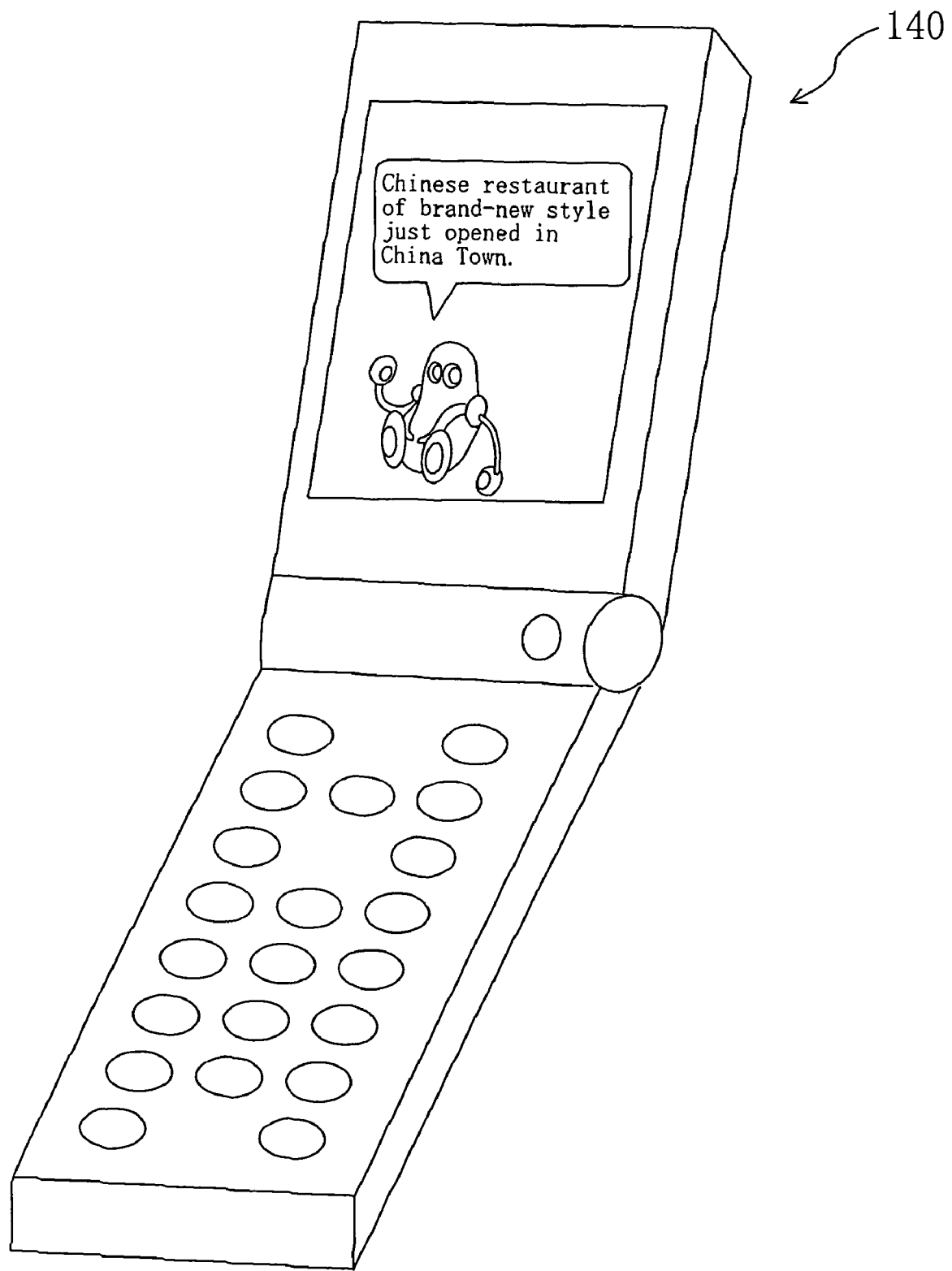
FIG. 7 illustrates a display example of a display screen of a cellular mobile phone 140 according to embodiment 1.
Figure 8:
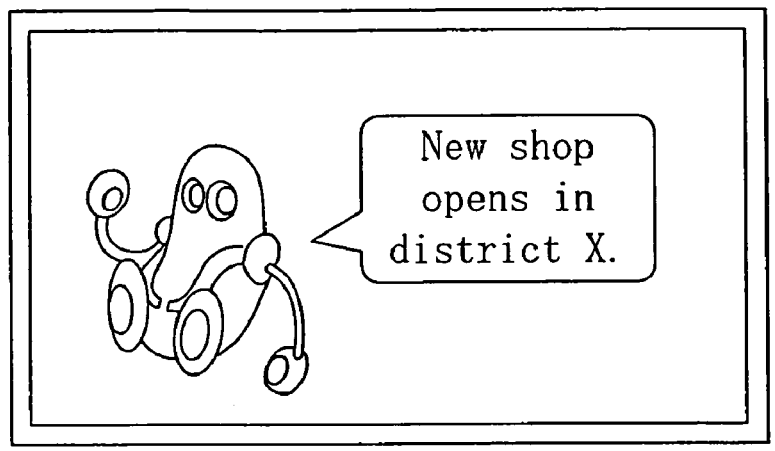
FIG. 8 illustrates a display example of a car navigation device 150 according to embodiment 1.
Figure 9:
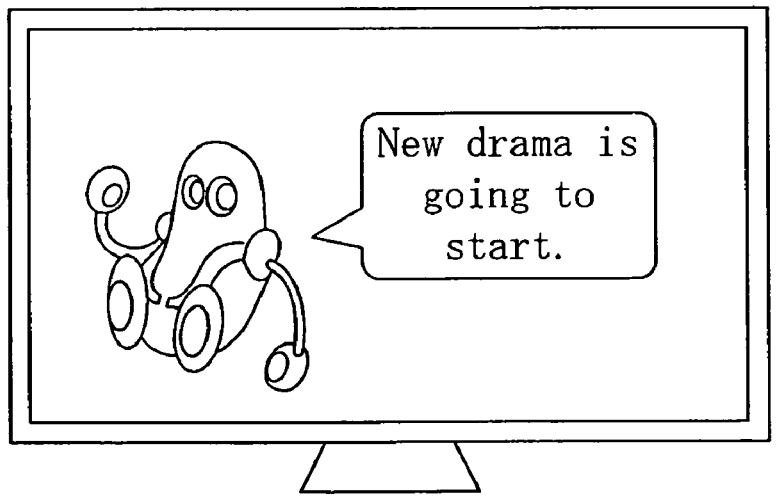
FIG. 9 illustrates a display example of a television set 160 according to embodiment 1.

In the cellular mobile phone 140, the terminal information presentation managing section 142 displays the content received by the terminal communication section 141 on the display section 143, thereby presenting the content to a user. FIG. 7 illustrates an example of a user display screen where the terminal apparatus is the cellular mobile phone 140. FIGS. 8 and 9 illustrate examples of a user display screen where the terminal apparatus is the car navigation device 150 or the television set 160, respectively. Herein, the content to be presented may be the same content regardless of the type of terminal apparatuses. Alternatively, different contents may be selected according to the type of terminal apparatuses.

(S110)

The content provision managing section 113 ends the transmission process of provided information and returns to step S101.

As described above, according to the information providing system of embodiment 1, the server 110 sets the priority of terminal apparatuses with which communication is attempted, and the terminal apparatuses, such as the cellular mobile phone 140, and the like, each set whether or not presentation of information is suitable. With such a structure, if information cannot be presented at any one of terminal apparatus, any alternative terminal apparatus can be used to present the information. As a result, loss of the chances of a user being presented with information is reduced.

[Variations]

Figure 10:
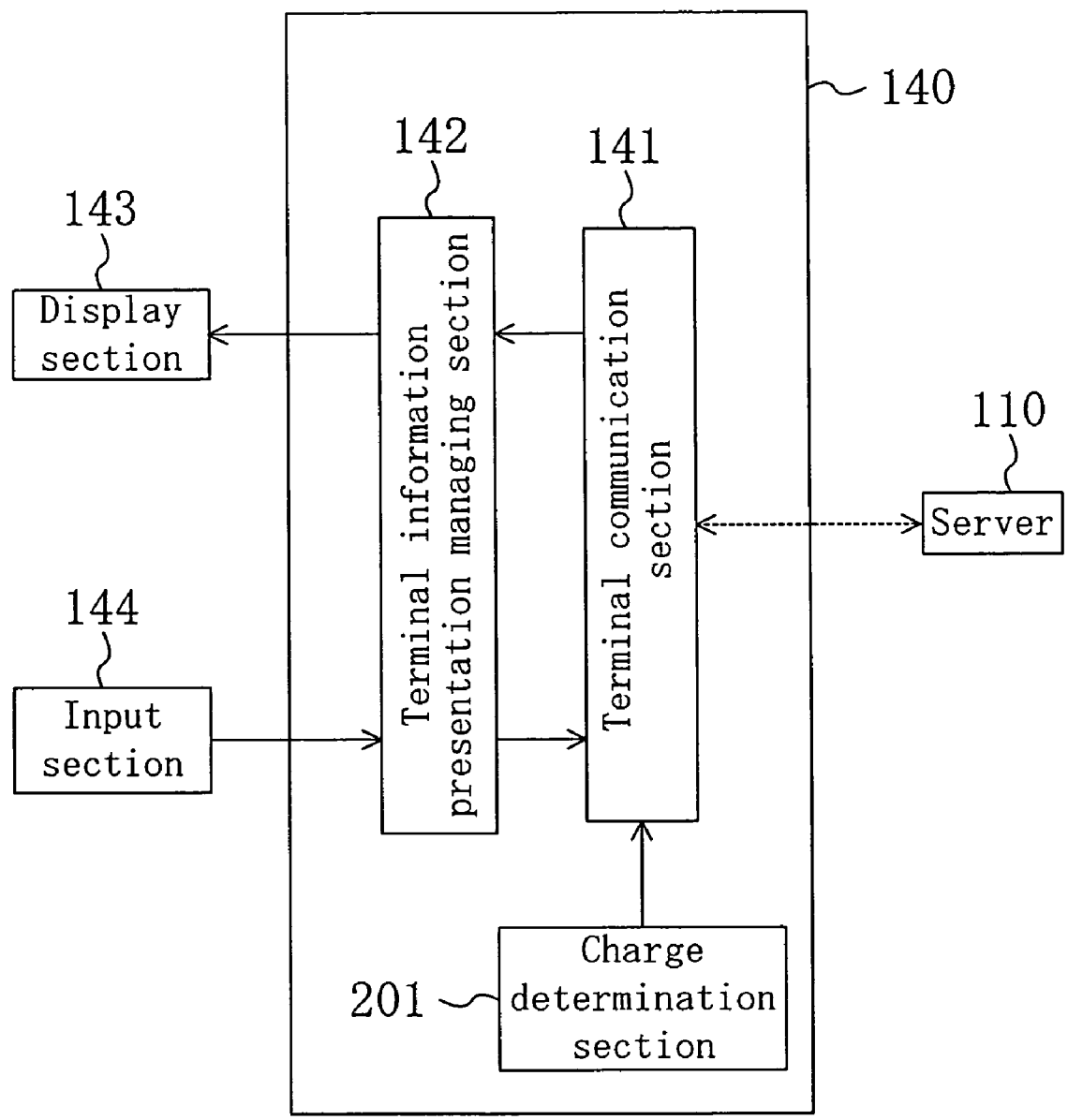
FIG. 10 is a block diagram showing a variation of a terminal apparatus of embodiment 1.

In the above-described example, a user sets whether or not presentation of information is suitable at a terminal apparatus, such as the cellular mobile phone 140, or the like, and the destination of transmitted information is determined according to the setting made by the user. However, the present invention is not limited to such a structure. For example, the determination of transmitted information may be determined according to information that is set automatically, such as the state of the cellular mobile phone 140, or the like. Specifically, for example, as shown in FIG. 10, a charge determination section 201 which indicates whether or not the terminal apparatus is in a charged state may be provided in place of the presentation suitableness controlling section 145 of FIG. 4. (In this section, like elements are denoted by like reference numerals used in FIG. 4, and descriptions thereof are omitted.) While the terminal apparatus is being charged with electric power, the charge determination section 201 returns a reply indicating that presentation of provided information is "unsuitable" in response to a query from the server 110. Alternatively, in response to a query from the server 110, the charge determination section 201 returns a reply indicating that the terminal apparatus is being charged with electric power and the server 110 determines, according to the reply, that presentation of provided information is "unsuitable". In this case, if a terminal apparatus, for example, the cellular mobile phone 140, is in a state generally unsuitable for browsing of a presentation of provided information, the information may be presented at an alternative terminal apparatus more suitable for presentation of the information.

Figure 11:
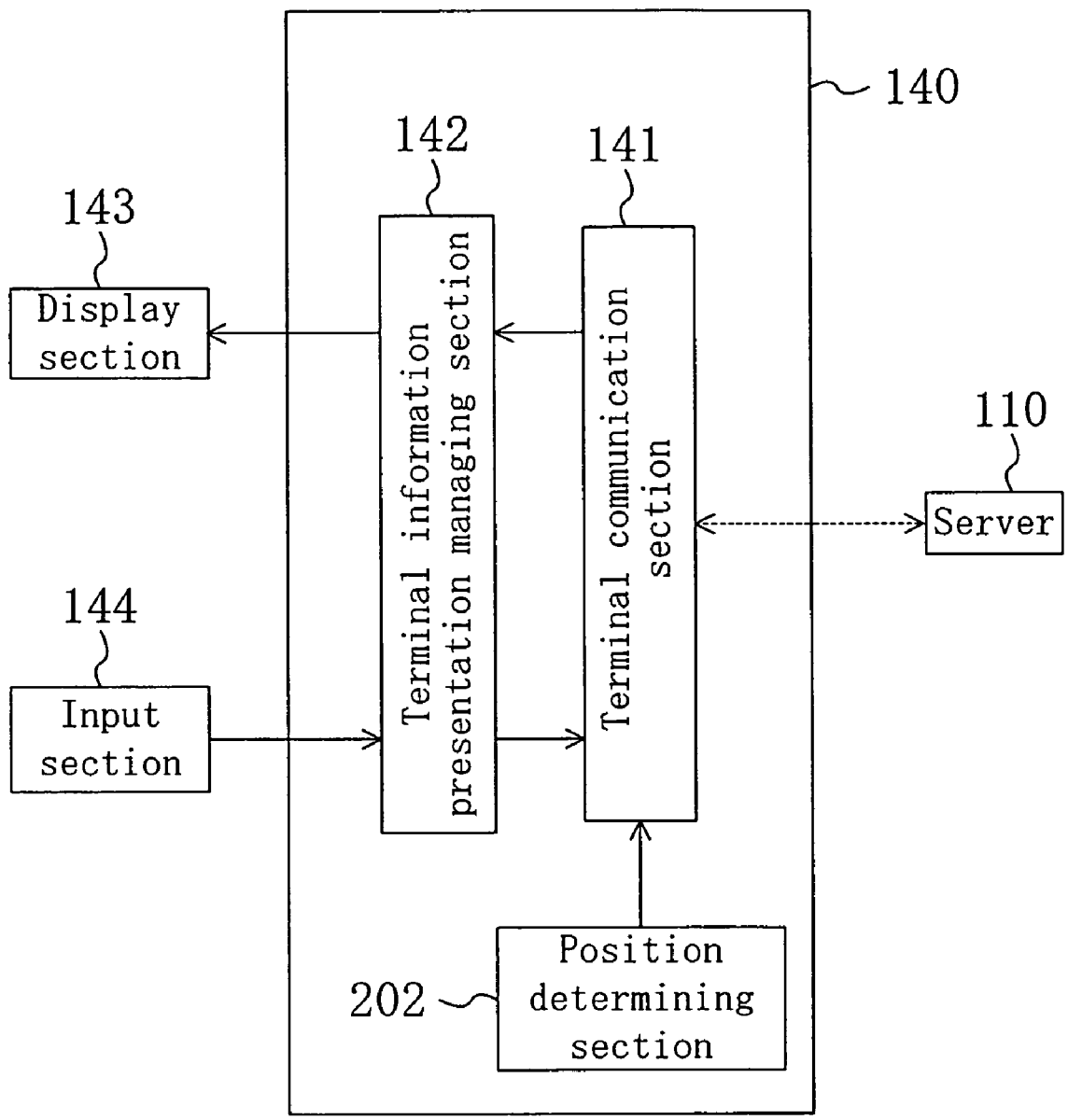
FIG. 11 is a block diagram showing a variation of a terminal apparatus of embodiment 1.

Alternatively, a position determining section 202 may be provided as shown in FIG. 11. With the position determining section 202, once a user sets whether or not communication is possible according to the position of the terminal apparatus, it is automatically determined (judged) whether or not communication is possible based on the position of the terminal apparatus. For example, if the terminal apparatus is at a place that has been set by the user to be an inappropriate place for receipt of a communication, information is presented using an alternative terminal apparatus. The position determining section 202 may be formed by an element for obtaining a current position based on, for example, a GPS (Global Positioning System) to determine whether or not the current position is within a predetermined range from a registered position or whether or not the current position is within a predetermined absolute positional range. It should be noted that the present invention is not limited to an example where communication is impossible at a registered position. For example, conversely, communication may be possible at a registered position.

Figure 12:
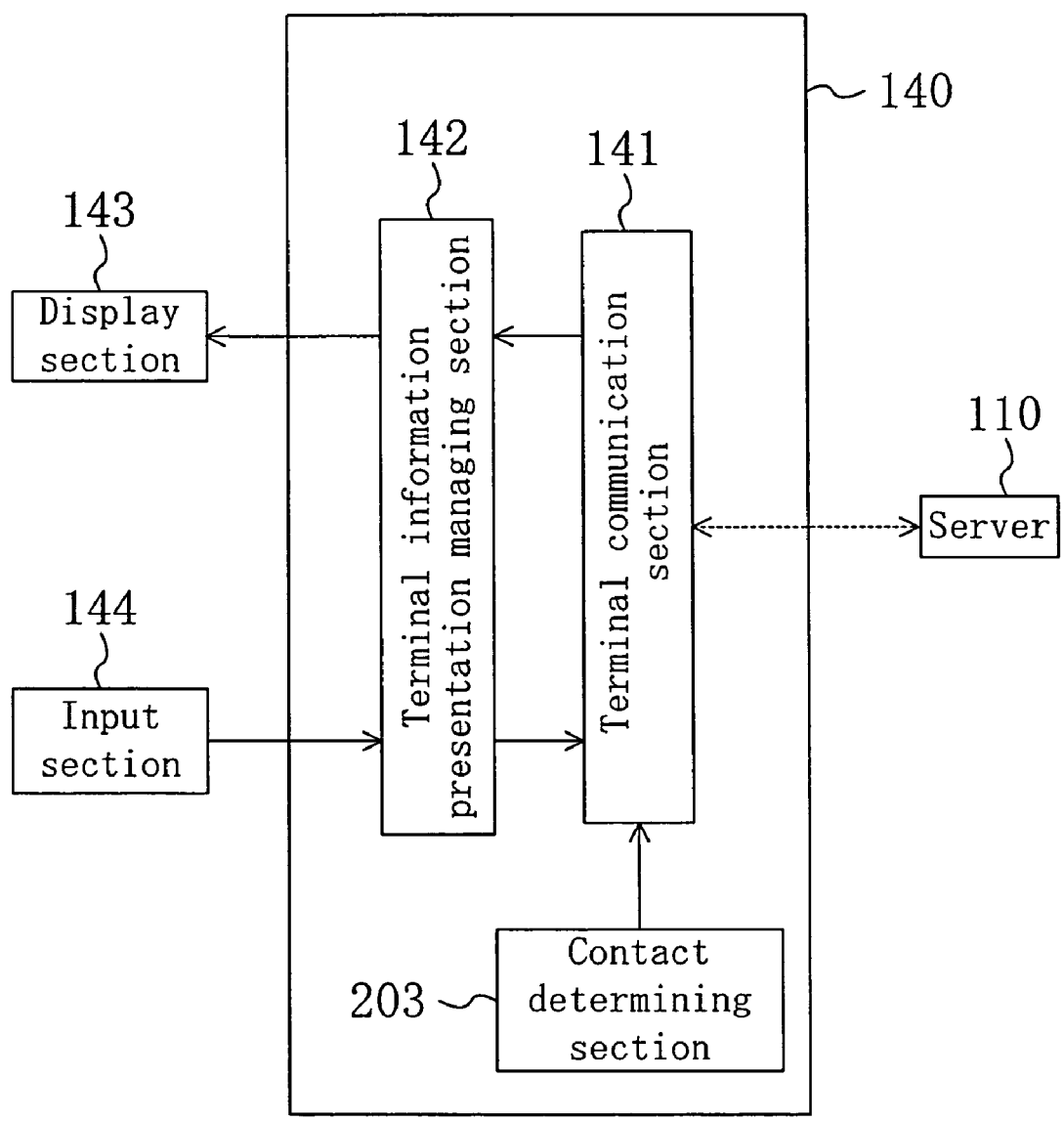
FIG. 12 is a block diagram showing a variation of a terminal apparatus of embodiment 1.

Alternatively, a contact determining section 203 may be provided as shown in FIG. 12. With the contact determining section 203, the possibility of communication, or the like, may be automatically determined according to the connection state of a contact terminal which is externally exposed for connecting the terminal apparatus to an external apparatus (for example, a mobile apparatus which uses a cellular mobile phone as a modem). For example, when the contact terminal of the terminal apparatus is in contact with a predetermined external terminal, presentation of provided information is "suitable" or "unsuitable". Specifically, when the terminal apparatus is placed in a predetermined table and is accordingly in an inappropriate state for use, an alternative terminal apparatus may be used for presentation of information.

Figure 13:
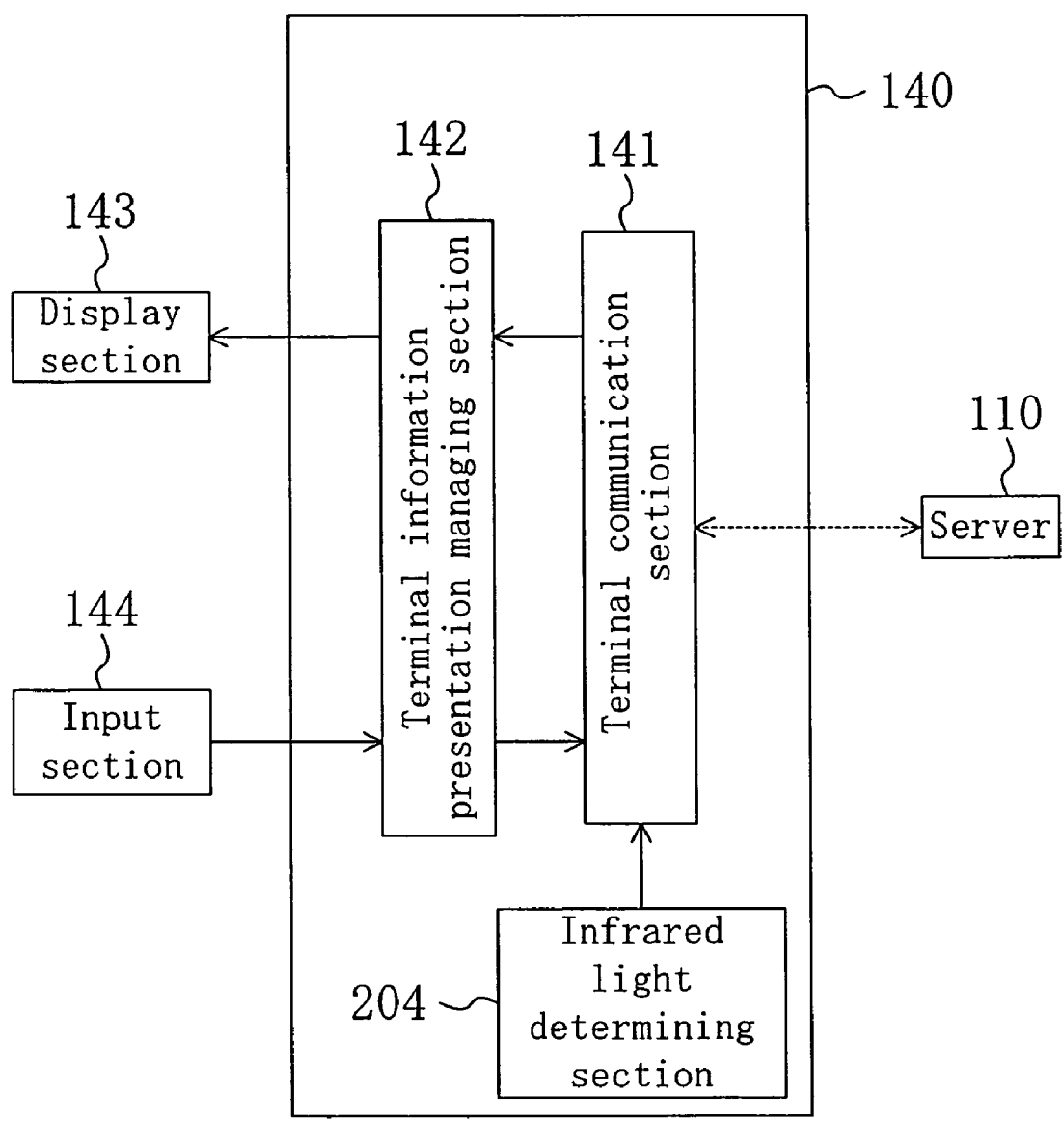
FIG. 13 is a block diagram showing a variation of a terminal apparatus of embodiment 1.
Figure 14:
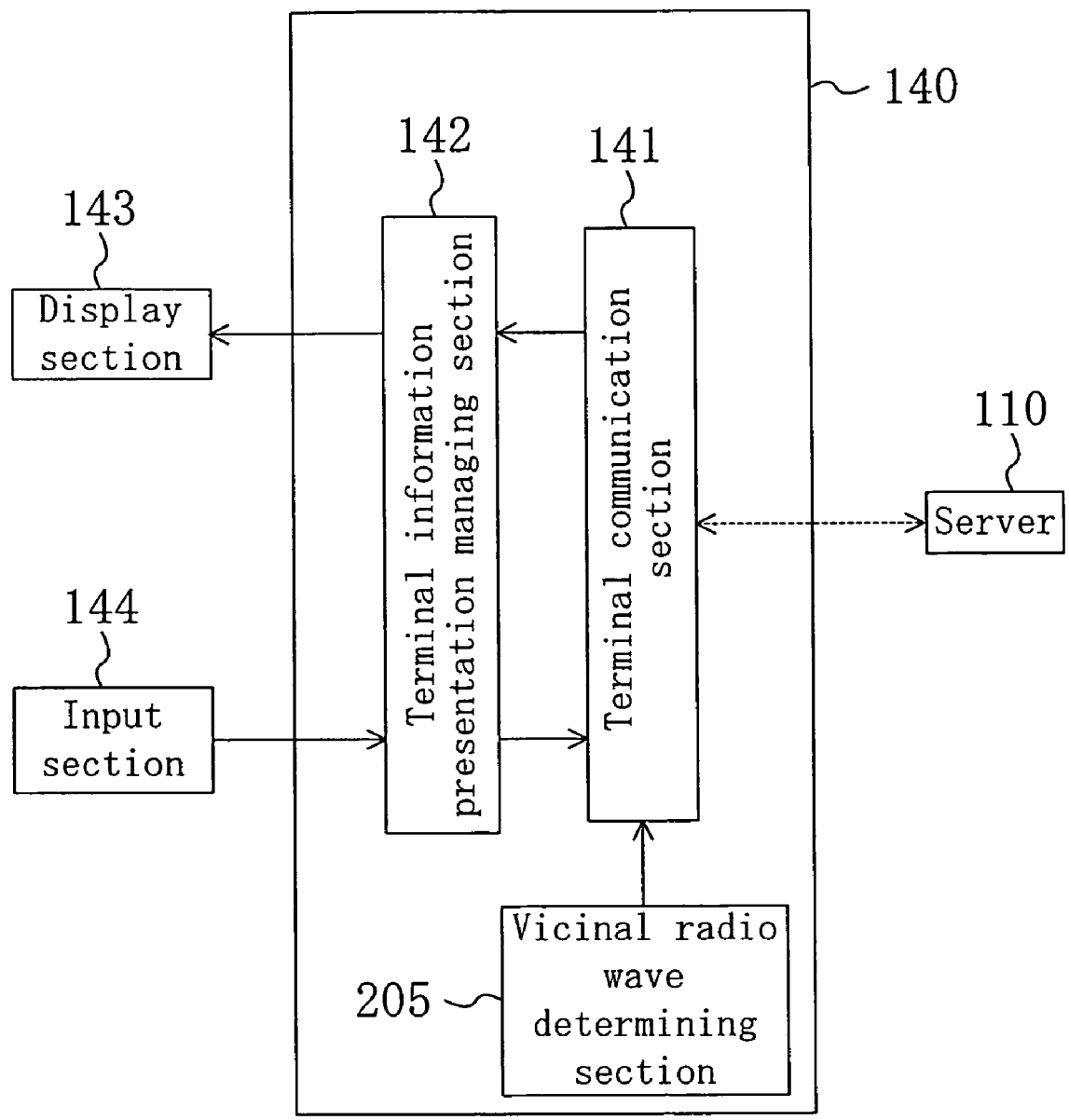
FIG. 14 is a block diagram showing a variation of a terminal apparatus of embodiment 1.

Alternatively, an infrared light determining section 204 or a vicinal radio wave determining section 205 may be provided as shown in FIG. 13 or 14, respectively. For example, presentation of provided information is "suitable" or "unsuitable" according to the state of reception of predetermined infrared light in the vicinity of the terminal apparatus, e.g., in a room of a home in which a signal is emitted from a remote controller of a household electric device, or according to the state of reception of a predetermined electric wave, e.g., in a running car in which a predetermined vicinal radio wave is emitted.

Embodiment 2

Figure 15:
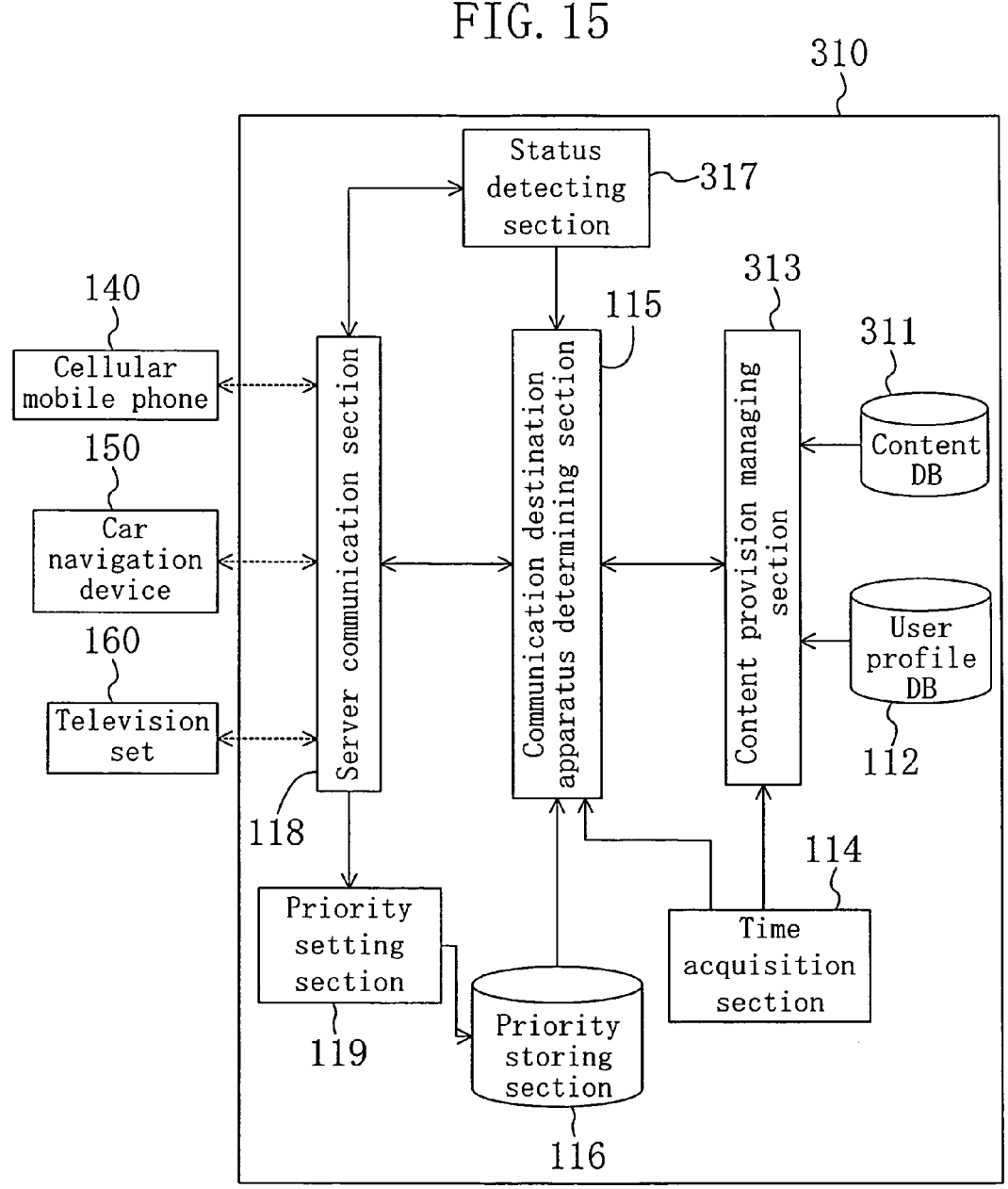
FIG. 15 is a block diagram showing in detail the structure of a server 310 according to embodiment 2.

FIG. 15 is a block diagram showing the structure of a server 310 according to embodiment 2 of the present invention. It should be noted that, in the following embodiments, like elements are denoted by like reference numerals used in embodiment 1, and descriptions thereof are omitted.

The server 310 is different from the server 110 (FIG. 2) of embodiment 1 in that the server 310 includes a content DB 311, a content provision managing section 313 and a status detecting section 317 in place of the content DB 111, the content provision managing section 113 and the status detecting section 117, respectively.

Figure 16:
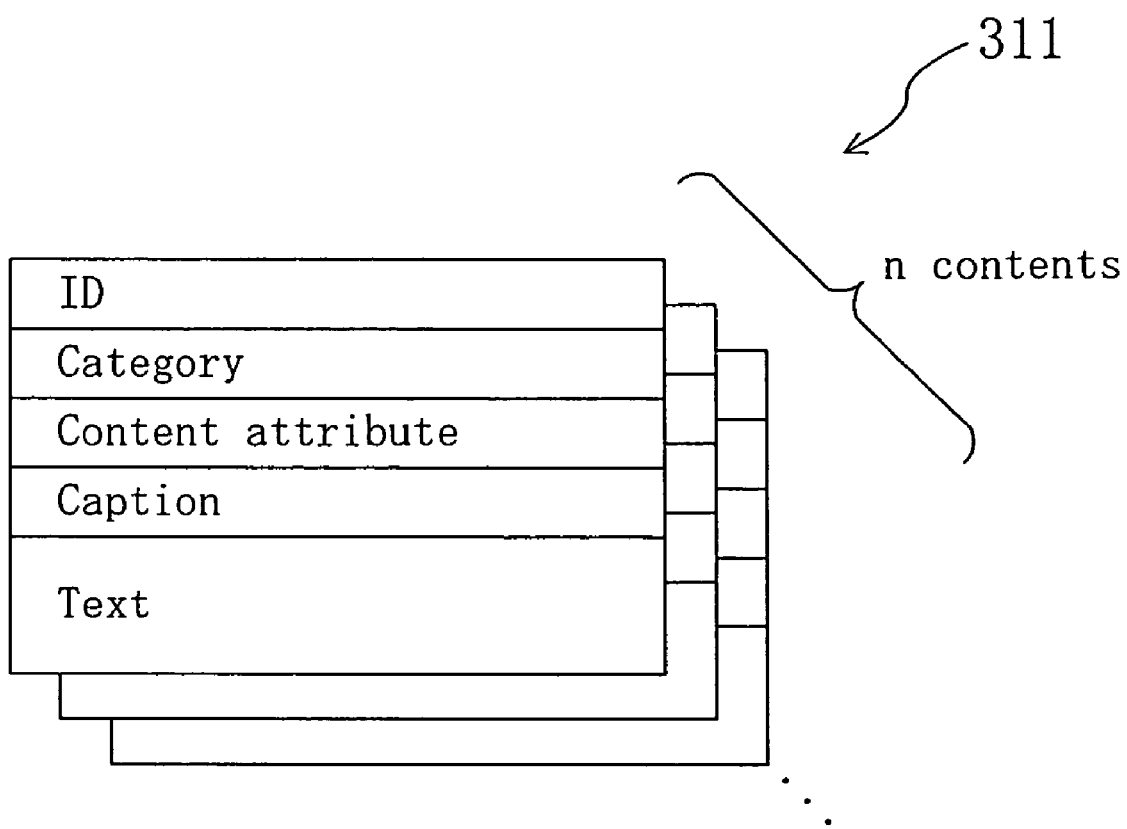
FIG. 16 showing an example of contents stored in the content DB 311 according to embodiment 2.

As shown in FIG. 16, the content DB 311 stores the attribute of each content in addition to the contents of the content DB 111 (FIG. 5) of embodiment 1. Specifically, the content DB 311 stores attribute information indicating which of a character, a still picture, a motion picture, sound, and combinations thereof each content is.

The content provision managing section 313 has the function of outputting the attribute information of a content extracted from the content DB 311 to the status detecting section 317 in addition to the function of the content provision managing section 113 of embodiment 1.

Figure 17:
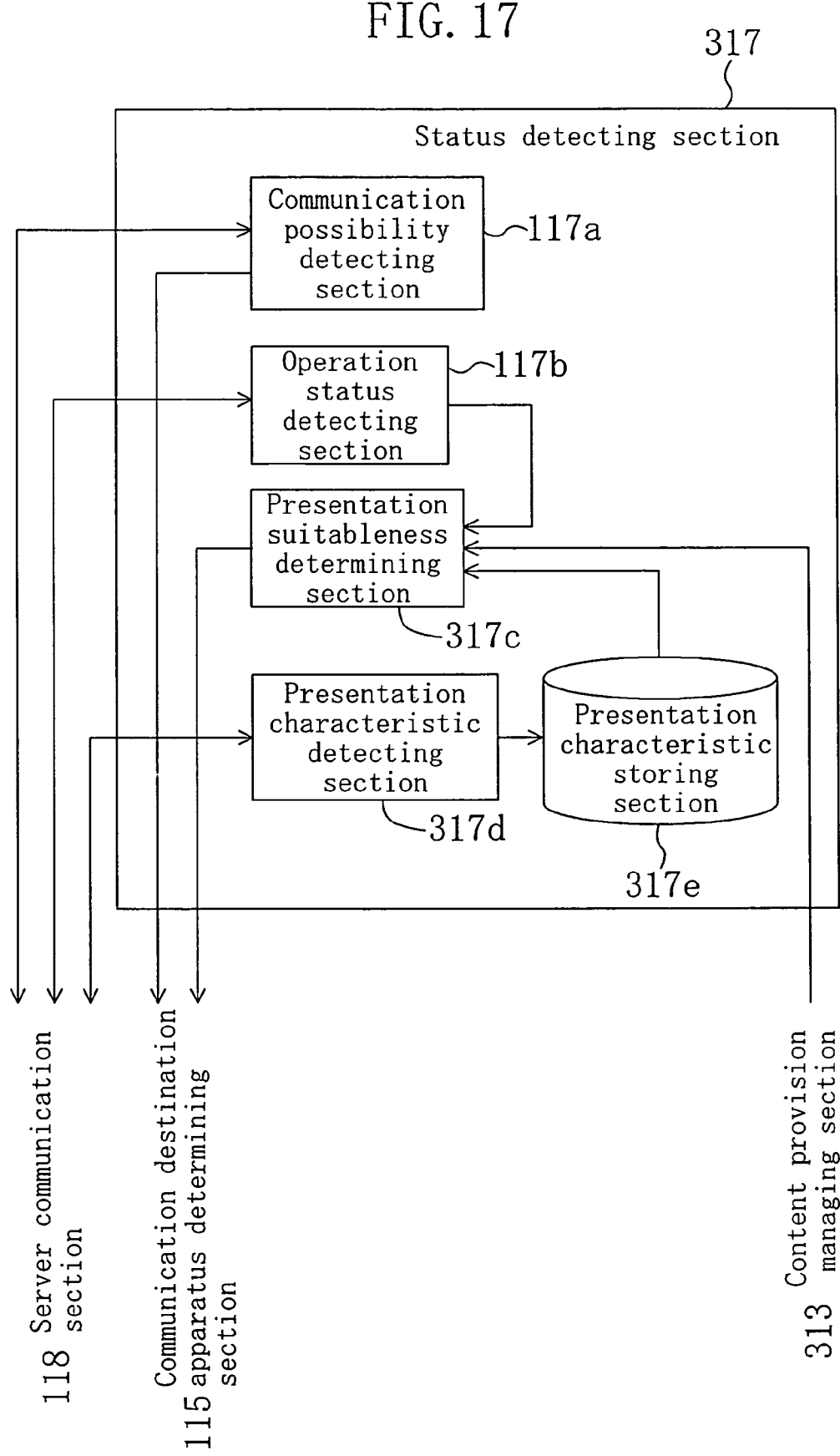
FIG. 17 is a block diagram showing in detail the structure of a status detecting section 317 according to embodiment 2.

For example, as shown in FIG. 17, the status detecting section 317 includes a presentation suitableness determining section 317c in place of the presentation suitableness determining section 117c of the status detecting section 117 (FIG. 3) of embodiment 1. Further, the status detecting section 317 includes a presentation characteristic detecting section 317d and a presentation characteristic storing section 317e. Based on presentation characteristic information output from the terminal information presentation managing section 142 (characteristic information transmitting means) of the cellular mobile phone 140, the presentation characteristic detecting section 317d detects the presentation characteristics, e.g., which of a character, a still picture, a motion picture, sound, and combinations thereof can be presented by the cellular mobile phone 140, or the like, the viewability of a motion picture, the viewability resulting from the screen size, screen brightness, or the like, whether or not a reply can be input or is readily input in response to a presented content which asks some reply, etc. The presentation characteristic storing section 317e stores presentation characteristic information output from the presentation characteristic detecting section 317d. The presentation characteristic information stored in the presentation characteristic storing section 317e is not limited to information obtained from the cellular mobile phone 140, or the like, as described above. The presentation characteristic information may be directly input to the server 310 or may be input by another terminal apparatus, or the like. Alternatively, presentation characteristic information may be obtained by the presentation characteristic detecting section 317d every time a content is provided, so that the presentation characteristic storing section 317e can be omitted. Alternatively, information that specifies the type of a device, or the like, is obtained from the cellular mobile phone 140, and a table which stores correspondences between the types of devices and presentation characteristic information inherent to the device types is referred to for obtaining presentation characteristic information.

The presentation suitableness determining section 317c of the status detecting section 317 determines whether or not each of the cellular mobile phone 140 and the like apparatuses is suitable for presentation of a content to be transmitted (including "whether or not it is capable of presenting a content to be transmitted") based on the operation status of the cellular mobile phone 140, or the like, which has been detected by the operation status detecting section 117b, the presentation characteristics stored in the presentation characteristic storing section 317e, and the attribute of a content output from the content DB 311.

The communication destination apparatus determining section 115 determines an apparatus of communication destination based on the determination as described above, an appropriate presentation is realized at an apparatus suitable for presentation.

Determination by the presentation suitableness determining section 317c as to the suitableness of presentation may be achieved by selecting one of multiple degrees of suitableness instead of determining whether or not it is suitable for presentation. In this case, an apparatus of communication determination may be determined based on the degree of suitableness of presentation and the priority obtained from the priority storing section 116. For example, the priority stored in the priority storing section 116 may be considered prior to the degree of suitableness, and if apparatuses have the same priority, a content is transmitted to an apparatus which is more suitable for presentation than the other. Conversely, an apparatus having a high degree of suitableness may be selected even if the priority exhibited by the priority storing section 116 is low. Alternatively, an overall priority may be determined according to the combinations of respective apparatuses and the degree of suitableness for presentation.

Embodiment 3

Figure 18:
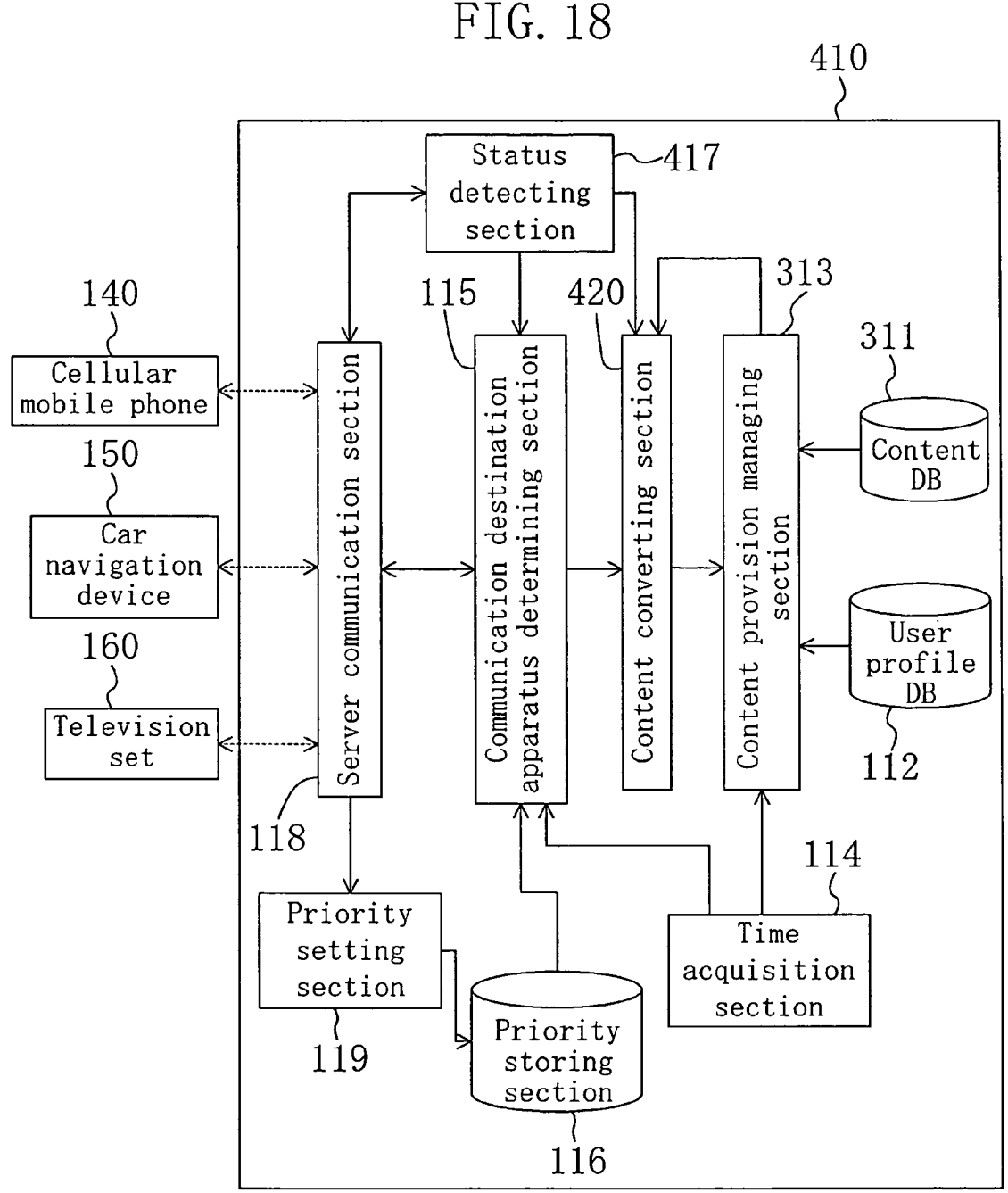
FIG. 18 is a block diagram showing in detail the structure of a server 410 according to embodiment 3.

FIG. 18 is a block diagram showing the structure of a server 410 according to embodiment 3 of the present invention. The server 410 is different from the server 310 (FIG. 15) of embodiment 2 in that the server 410 includes a status detecting section 417 in place of the status detecting section 317 and further includes a content converting section (format converting means) 420.

Figure 19:
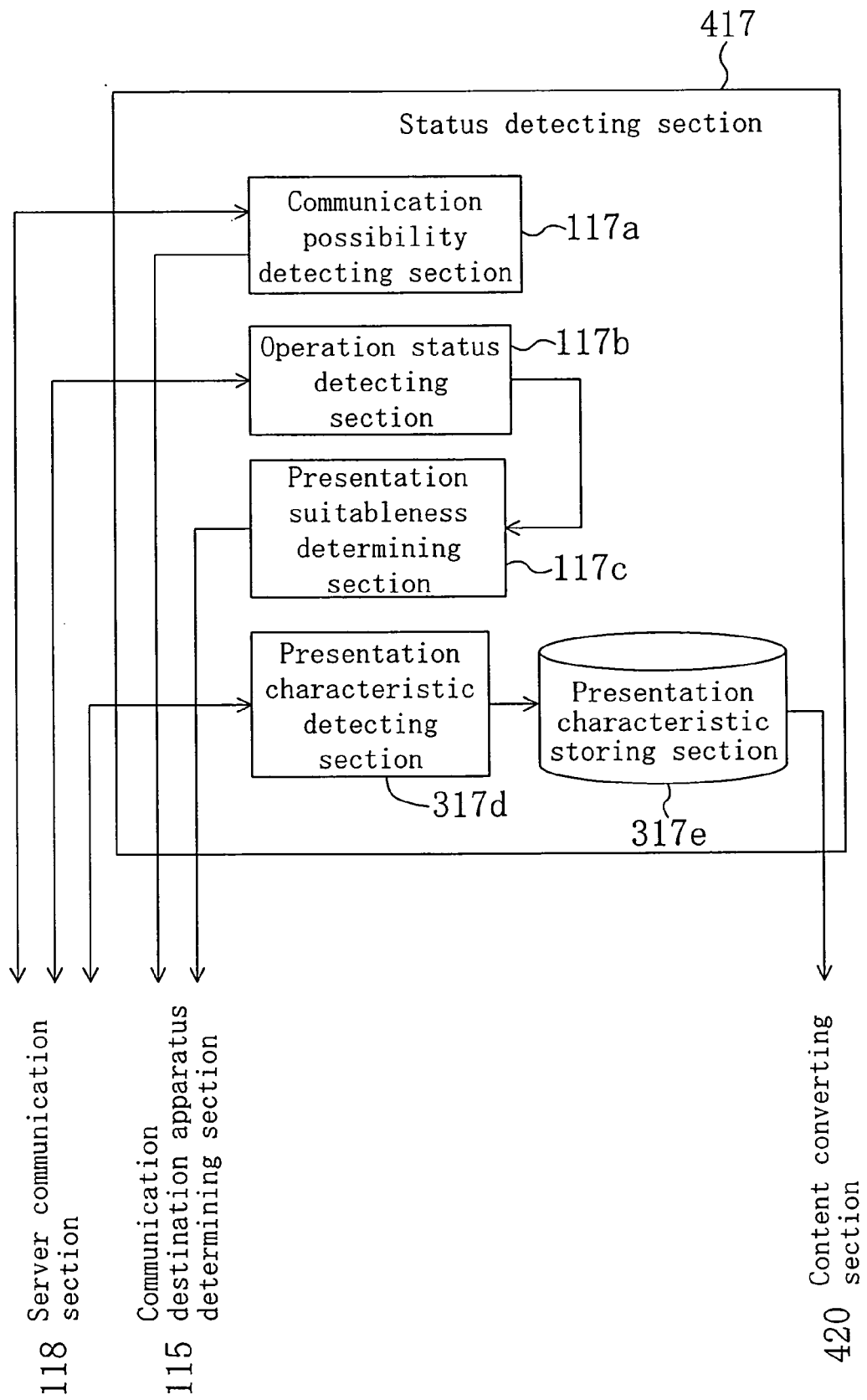
FIG. 19 is a block diagram showing in detail the structure of a status detecting section 417 according to embodiment 3.

As shown in FIG. 19, the status detecting section 417 includes the presentation characteristic detecting section 317d and the presentation characteristic storing section 317e of the status detecting section 317 (FIG. 17) of embodiment 2 in addition to the elements of the status detecting section 117 (FIG. 3) of embodiment 1. (It should be noted that any one of the presentation characteristic detecting section 317d and the presentation characteristic storing section 317e may be omitted when the method for acquiring presentation characteristics as described in embodiment 2 is employed).

Figure 20:
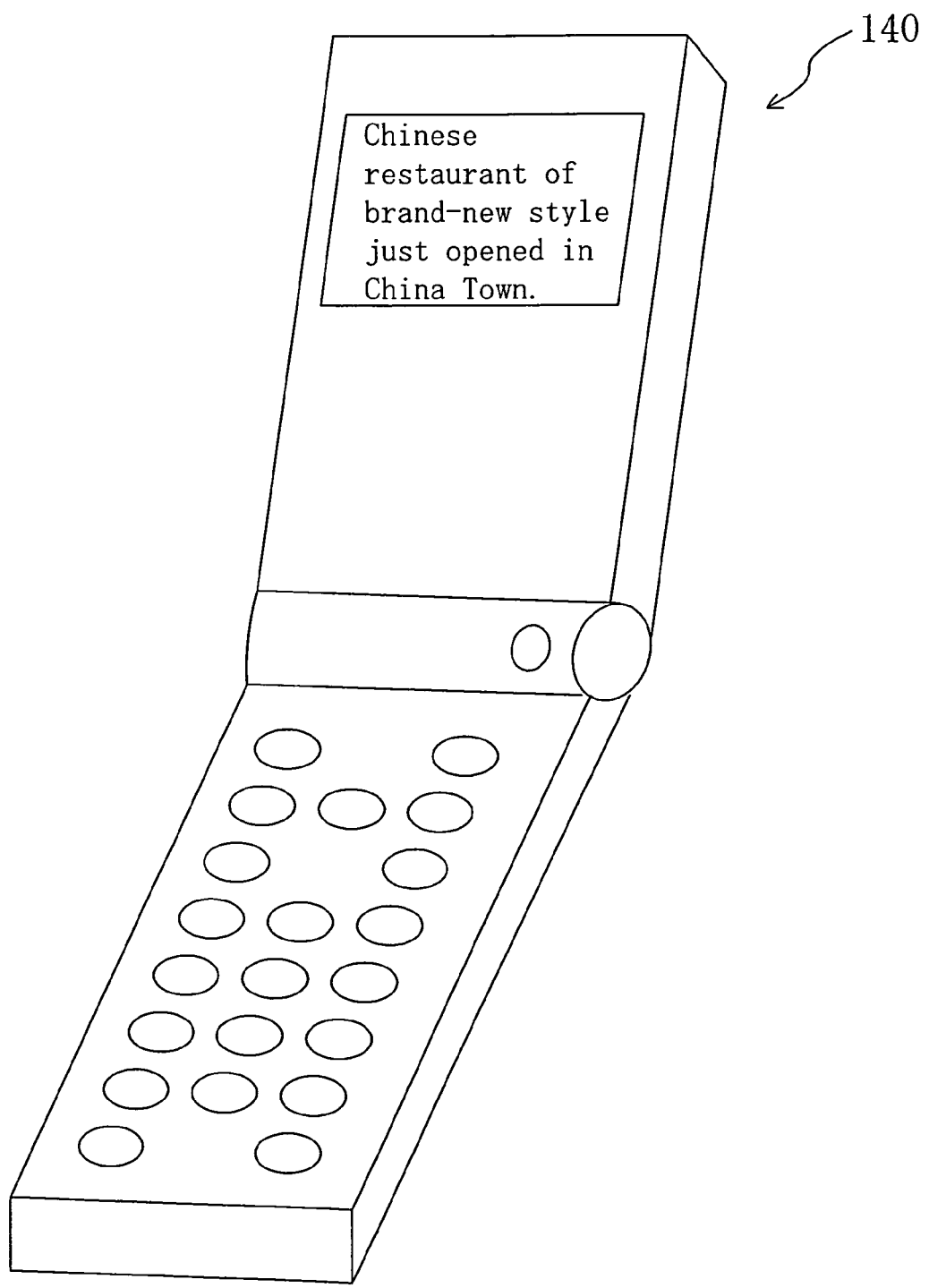
FIG. 20 illustrates a display example of a display screen of a cellular mobile phone 140 according to embodiment 3.

The content converting section 420 converts the format of a content to be transmitted based on the presentation characteristics of the cellular mobile phone 140, or the like, which are output from the status detecting section 417 and the attribute of the content which is output from the content provision managing section 313, so as to comply with the presentation characteristics. Specifically, for example, if a content stored in the content DB 311 includes an image as shown in FIG. 7 whereas the cellular mobile phone 140 has only the characteristic (function) of displaying a text, only a text is extracted from the content and transmitted to the cellular mobile phone 140, whereby the content is appropriately presented as shown in FIG. 20. It should be noted that conversion of contents is not limited to deletion of an image as described above. For example, a summarized text may be displayed, or only a caption may be displayed. Alternatively, the size, the number of colors or the resolution of an image may be converted. A text may be converted to sound data. Furthermore, the present invention is not limited to conversion of contents. For example, a content may be selectively read from the content DB 311 according to the presentation characteristics.

The priority of destinations of transmission which is set by the priority storing section 116 (the priority of destinations with which communication is attempted) is not limited to a fixed priority. For example, the priority may be changed according to the time, or the like, as shown in FIG. 21. Herein, setting of the priority in the server 110 according to the time as described above can readily be achieved by unshown means, such as an entry form or document on a homepage, or the like. In the case of such a structure, communication with terminal apparatuses can be flexibly attempted in an efficient order in accordance with a schedule of a user. Alternatively, the priority may be set according to the days of the week, the months, the seasons, or the like. For example, the priority of a cellular mobile phone is set higher in weekdays, and the priority of a television set in the home is set higher in holidays. Still alternatively, a priority table wherein the priority is determined according to the time zones may be set for each day of the week, for example.

Alternatively, for example, as shown in FIG. 22, transmission may be suspended for a predetermined time period by issuing information indicative of suspension of transmission (suppression of presentation). For example, information is not transmitted to any terminal in the time zone of 7:00 to 8:00, but after 8:00, it is transmitted to any terminal. In the time zone of 16:00 to 17:00, if presentation of information is suitable at a cellular mobile phone which has the first priority, the information is transmitted to the cellular mobile phone. If not suitable, the information is not transmitted to any other apparatus, but after 17:00, it is transmitted to a car navigation device, or the like. Even if the information indicative of suspension of transmission is not issued, presentation of information may be suspended. For example, when presentation of information at a television set which has the first priority in the time zone of 18:00 to 0:00 is suitable rather than presentation of the information at a cellular mobile phone which has the second priority in the time zone of 17:00 to 18:00, the information is not presented at the cellular mobile phone even if information cannot be presented at the car navigation device. Presentation of the information is suspended until 18:00, and then, the information is presented at the television set.

Setting of the priority is not limited to setting by an explicit instruction from a user. The priority may be set or updated based on a track record of user's presentation manipulation, or the like. For example, the priority may be increased or decreased according to whether or not a user has actually performed manipulation for presenting a content transmitted to any apparatus, whether or not the user has performed manipulation for suppressing presentation of the content, or whether or not the user has performed manipulation for presenting details of the content when only a title of the content was presented. Alternatively, where a content is simultaneously transmitted to a plurality of apparatuses, the priority of the first apparatus in which presentation manipulation for the content is performed earlier than the other apparatuses may be increased.

In the above example, a content to be provided is determined based on categories represented by a user profile, but the present invention is not limited thereto. Any other method, for example, a method for determining the priority for providing contents as described in Japanese Unexamined Patent Publication No. 2001-92824, may be used.

If a content to be presented is a mail, an apparatus to which the mail is to be transmitted is determined according to the accumulation amount of unread mails in each apparatus. For example, if a large number of unread mails of recent receiving dates are accumulated in an apparatus, there is a high possibility that the apparatus is frequently used for reading mails, and therefore, the apparatus is set so as to receive mails prior to the other apparatuses. If a large number of unread mails of old receiving dates are accumulated in an apparatus, there is a high possibility that the apparatus is not frequently used for reading mails, and therefore, the priority of the apparatus for transmission is decreased. In this way, the possibility that mails are appropriately read is increased.

In an alternative example, a server checks whether or not a mail transmitted to an apparatus in a time zone having a certain priority has been read, and if the mail has not been read until a next time zone having a different priority, the unread mail is transmitted to another apparatus according to the priority of the next time zone. In this case, the unread mail at the first apparatus may be forcedly deleted or may be provided with a mark indicating that the mail has been transferred to another apparatus.

INDUSTRIAL APPLICABILITY

As described above, according to the present invention, provided information is transmitted to an appropriate terminal apparatus according to the status or characteristics of terminal apparatuses, whereby secure provision of appropriate information is readily achieved. Thus, the present invention is useful in the field of services of providing various information through a network, or the like.

The invention claimed is:
1. An information providing apparatus for transmitting provided information which is to be presented at a provided-information presenting apparatus, the information providing apparatus comprising:
   destination information storage device including a processor that stores destination information indicative of one or more provided-information presenting apparatuses for each one of a plurality of information recipients;
   communication capability detecting section that detects whether or not communication with the provided-information presenting apparatuses can be performed;
   presentation functionality determining section that determines whether or not presentation of the provided information at the provided-information presenting apparatuses can be performed;
   destination determining section that selects a destination of the provided information among provided-information presenting apparatuses which have been detected by the communication capability detecting section to be available for communication, according to a predetermined priority, based on a determination result by the presentation functionality determining section;
   transmission device that transmits the provided information to the provided-information presenting apparatus selected by the destination determining section; and
   operation status detecting section that detects the operation status of the provided information presenting means,
   wherein:
   (a) the presentation functionality determining section determines whether or not presentation of the provided information can be performed based on the operation status;
   (b) the operation status detecting section detects whether or not a battery of each of the provided-information presenting apparatuses is being charged with electric power; and
   (c) the destination determining section selects, among provided-information presenting apparatuses based on whose battery is not being charged with electric power, a provided-information presenting apparatus having a high priority as the destination.

* * * * *